United States Patent
Sato et al.

(10) Patent No.: US 11,173,573 B2
(45) Date of Patent: Nov. 16, 2021

(54) LASER PROCESSING METHOD AND LASER PROCESSING DEVICE

(71) Applicant: HONDA MOTOR CO., LTD., Tokyo (JP)

(72) Inventors: Takanori Sato, Tochigi (JP); Shin Yoshida, Tochigi (JP); Masahiro Koike, Tochigi (JP); Kenichi Fukami, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 582 days.

(21) Appl. No.: 15/760,847

(22) PCT Filed: Sep. 16, 2016

(86) PCT No.: PCT/JP2016/077540
§ 371 (c)(1),
(2) Date: Mar. 16, 2018

(87) PCT Pub. No.: WO2017/047785
PCT Pub. Date: Mar. 23, 2017

(65) Prior Publication Data
US 2018/0257177 A1    Sep. 13, 2018

(30) Foreign Application Priority Data

Sep. 18, 2015 (JP) .............................. JP2015-184678

(51) Int. Cl.
*B23K 26/38* (2014.01)
*B23K 26/10* (2006.01)
*B23K 26/08* (2014.01)

(52) U.S. Cl.
CPC .............. *B23K 26/38* (2013.01); *B23K 26/08* (2013.01); *B23K 26/0869* (2013.01); *B23K 26/10* (2013.01)

(58) Field of Classification Search
CPC .... B23K 26/38; B23K 2101/16; B23K 26/14; B23K 26/16; B23K 2101/18;
(Continued)

(56) References Cited

U.S. PATENT DOCUMENTS 4,201,905 A * 5/1980 Clark ..................... B21D 28/12
219/121.6
4,335,296 A * 6/1982 Bredow ............. B23K 26/0853
219/121.67
(Continued)

FOREIGN PATENT DOCUMENTS

CN      102179623 A     9/2011
JP      S63-33190 A     2/1988
(Continued)

OTHER PUBLICATIONS

Office Action issued in the corresponding CN Patent Application No. CN201680052095.9, dated Sep. 12, 2019.
(Continued)

*Primary Examiner* — Tu B Hoang
*Assistant Examiner* — Vy T Nguyen
(74) *Attorney, Agent, or Firm* — Carrier Blackman & Associates, P.C.; Joseph P. Carrier; William D. Blackman

(57) ABSTRACT

Provided are a laser processing method and a laser processing device which prevent a laser irradiation unit from colliding with an edge of a plate material when the laser irradiation unit returns to a portion just above the plate material from an outer part of the portion just above the plate material. The laser processing method for cutting a plate material by laser irradiation, the method including: a plate material end portion holding process of holding a position of an end portion of the plate material at a predetermined position when a laser irradiation unit is present outside a portion just above the plate material; and a laser irradiation
(Continued)

unit moving process in which the laser irradiation unit moves from an outer part of the portion just above the plate material to the portion just above the plate material.

3 Claims, 4 Drawing Sheets

(58) Field of Classification Search
CPC ............ B23K 2103/04; B23K 2103/16; B23K 2103/172; B23K 2103/38; B23K 2103/50; B23K 26/0838; B23K 26/0846; B23K 26/0876; B23K 26/123; B23K 26/40; B23K 26/703; B23K 37/0235; D06H 7/22
USPC .................. 219/121.67, 121.72, 121.82, 68; 428/293.1, 294, 295; 29/33; 310/248
See application file for complete search history.

(56) References Cited

U.S. PATENT DOCUMENTS

| | | | | |
|---|---|---|---|---|
| 5,006,694 A | * | 4/1991 | Handke | B23K 26/702 219/121.6 |
| 5,168,610 A | * | 12/1992 | Ichimura | B23P 23/02 29/33 J |
| 5,354,607 A | * | 10/1994 | Swift | G03G 15/75 310/248 |
| 6,423,928 B1 | * | 7/2002 | Piwczyk | B23K 26/04 219/121.67 |
| 6,601,426 B2 | * | 8/2003 | Wegener | B21D 25/02 219/121.63 |
| 6,710,291 B1 | * | 3/2004 | Wegener | B21D 22/02 219/121.6 |
| 2006/0118529 A1 | * | 6/2006 | Aoki | B23K 26/16 219/121.67 |
| 2009/0159579 A1 | * | 6/2009 | Nishio | B23K 37/0408 219/121.63 |
| 2011/0240612 A1 | * | 10/2011 | Maeno | B23K 26/0884 219/121.63 |
| 2013/0001206 A1 | | 1/2013 | Yamamoto et al. | |
| 2013/0098876 A1 | * | 4/2013 | Kobayashi | B23K 37/0235 219/68 |
| 2016/0214207 A1 | * | 7/2016 | Okazaki | B23K 26/0838 |
| 2016/0368084 A1 | * | 12/2016 | Henneke | B23K 26/0884 |

FOREIGN PATENT DOCUMENTS

| | | |
|---|---|---|
| JP | H04-80681 U | 7/1992 |
| JP | H06-246469 A | 9/1994 |
| JP | H09-122959 A | 5/1997 |
| JP | 10137970 A | 5/1998 |
| JP | 4290656 B2 | 7/2009 |
| JP | 2013-086144 A | 5/2013 |
| WO | 2011114592 A1 | 9/2011 |

OTHER PUBLICATIONS

Notification of Reasons for Refusal issued in the corresponding JP Patent Application No. 2017-540022, dated Sep. 24, 2019.

* cited by examiner

LASER PROCESSING METHOD AND LASER PROCESSING DEVICE

TECHNICAL FIELD

The present invention relates to a laser processing method and a laser processing device for cutting a plate material into a desired shape, by laser irradiation on a flat plate material.

BACKGROUND ART

Conventionally, there have been known a laser processing method and a laser processing device for cutting a plate material into a desired shape by laser irradiation on a flat plate material to form a blank material (for example, Patent Document 1). The plate material is continuously fed out from a coil material, and the plate material is subjected to straightening by a leveler device, and thereafter cut by a YAG laser beam emitted from a processing head. Therefore, a blank material is obtained.

Patent Document 1: Japanese Patent No. 4290656

DISCLOSURE OF THE INVENTION

Problems to be Solved by the Invention

In the laser processing method and the laser processing device described in the above Patent Document 1, a laser irradiation unit, of a processing head that emits the laser beam, moves just above the plate material to cut the plate material. Therefore, in a width direction of the plate material with respect to a direction in which the plate material is fed out, the laser irradiation unit is not moved to the outer part of the portion just above the plate material.

In a case where the laser irradiation unit moves to the outer part of the portion just above the plate material in the width direction of the plate material with respect to the direction in which the plate material is fed out, although the plate material is straightened by the leveler device, since the plate material has waviness, when the laser irradiation unit returns to a portion just above the plate material, there is a risk of collision with the side edge of the plate material.

An object of the present invention is to provide a laser processing method and a laser processing device which prevent the laser irradiation unit from colliding with the edge of the plate material when returning from the outer part of a portion just above the plate material to a portion just above the plate material.

Means for Solving the Problems

In order to achieve the above object, the present invention is a laser processing method for cutting a plate material (for example, a plate material P to be described later) by laser irradiation, the method including: a plate material end portion holding process of holding a position of an end portion of the plate material at a predetermined position when a laser irradiation unit is present outside a portion just above the plate material; and a laser irradiation unit moving process in which the laser irradiation unit moves from an outer part of the portion just above the plate material to the portion just above the plate material.

According to the present invention, in the plate material end portion holding process, when the laser irradiation unit is present outside the portion just above the plate material, the position of the end portion of the plate material is held at a predetermined position. Accordingly, when moving the laser irradiation unit to the portion just above the plate material from the outer part of the portion just above the plate material in the laser irradiation unit moving process, it is possible to prevent the laser irradiation unit from colliding with the edge of the plate material in which the waviness occurs.

Further, in the laser irradiation unit moving process, the laser irradiation unit is moved in a state of holding the position of the plate material at the predetermined position. This makes it possible to reliably prevent the laser irradiation unit from colliding with the edge of the plate material, when the laser irradiation unit is moved from the outer part of the portion just above the plate material to the portion just above the plate material in the laser irradiation unit moving process.

Further, in the laser irradiation unit moving process, the laser irradiation unit is moved, while emitting the laser from the laser irradiation unit. Therefore, the plate material can be cut by laser irradiation, from the edge of the plate material in the movement direction of the laser irradiation unit.

Further, in the plate material end portion holding process, the end portion of the plate material is held at the predetermined position by a first workpiece holding tool (for example, a first workpiece holding tool 41 to be described later). In the laser irradiation unit moving process, the plate material is held at the predetermined position by the second workpiece holding tool (for example, a second workpiece holding tool 42 to be described later) having a smaller clearance with respect to the plate material than the first workpiece holding tool.

Therefore, after correcting the waviness in the plate material by the first workpiece holding tool, the vibration is suppressed by the second workpiece holding tool, and the distance between the laser irradiation unit and the plate material can be suppressed with high accuracy to a range of the value of an appropriate distance in which the plate material can be cut by laser irradiation. Further, since the clearance between the second workpiece holding tool and the plate material is smaller than the clearance between the first workpiece holding tool and the plate material, when the laser irradiation unit moves on the plate material, only the second workpiece holding tool comes into contact with the plate material to ensure a clearance, and the first workpiece holding tool is in a state of not coming into contact with the plate material. Since only the second workpiece holding tool comes into contact with the plate material, the friction with the plate material can be reduced as compared with a case where both the first workpiece holding tool and the second workpiece holding tool come into contact with the plate material.

Further, the present invention provides a laser processing device (for example, a laser processing device 1 to be described later) which has a laser irradiation unit (for example, a laser irradiation unit 30 to be described later); a driving unit (for example, a driving unit 60 to be described later) which moves the laser irradiation unit from a portion just above a plate material (for example, a plate material P to be described later) to an outer part of the portion just above the plate material; and a workpiece holding tool (for example, a workpiece holding tool 40 to be described later) which holds the plate material at a predetermined position, while moving with the movement of the laser irradiation unit. When the laser irradiation unit is present outside the portion just above the plate material, the workpiece holding tool is at a position capable of holding the end portion of the plate material at the predetermined position.

According to the present invention, when the laser irradiation unit is present outside the portion just above the plate material, the position of the end portion of the plate material can be held at a predetermined position. Thus, when the laser irradiation unit is moved from the outer part of the portion just above the plate material to the portion just above the plate material, it is possible to prevent the laser nozzle of the laser irradiation unit from colliding with the edge of the plate material.

Further, the workpiece holding tool includes a first workpiece holding tool (for example, a first workpiece holding tool 41 to be described later), and a second workpiece holding tool (for example, a second workpiece holding tool 42 to be described later) which is disposed closer to the laser irradiation unit than the first workpiece holding tool and has a smaller clearance with respect to the plate material than the first workpiece holding tool.

Therefore, after correcting the waviness in the plate material by the first workpiece holding tool, the vibration is suppressed by the second workpiece holding tool, and it is possible suppress the distance between the laser irradiation unit and the plate material to the range of the second predetermined value with high accuracy. Further, since the clearance between the second workpiece holding tool and the plate material is smaller than the clearance between the first workpiece holding tool and the plate material, when the laser irradiation unit moves on the plate material, only the second workpiece holding tool comes into contact with the plate material to ensure a clearance, and the first workpiece holding tool is in a state of not coming into contact with the plate material. Since only the second workpiece holding tool comes into contact with the plate material, the friction with the plate material can be reduced, as compared with a case where both the first workpiece holding tool and the second workpiece holding tool come into contact with the plate material.

Effects of the Invention

According to the present invention, it is possible to provide a laser processing method and a laser processing device for preventing a laser irradiation unit from colliding with an edge of a plate material when returning from an outer part of a portion just above the plate material to the portion just above the plate material.

PREFERRED MODE FOR CARRYING OUT THE INVENTION

Figure 1:
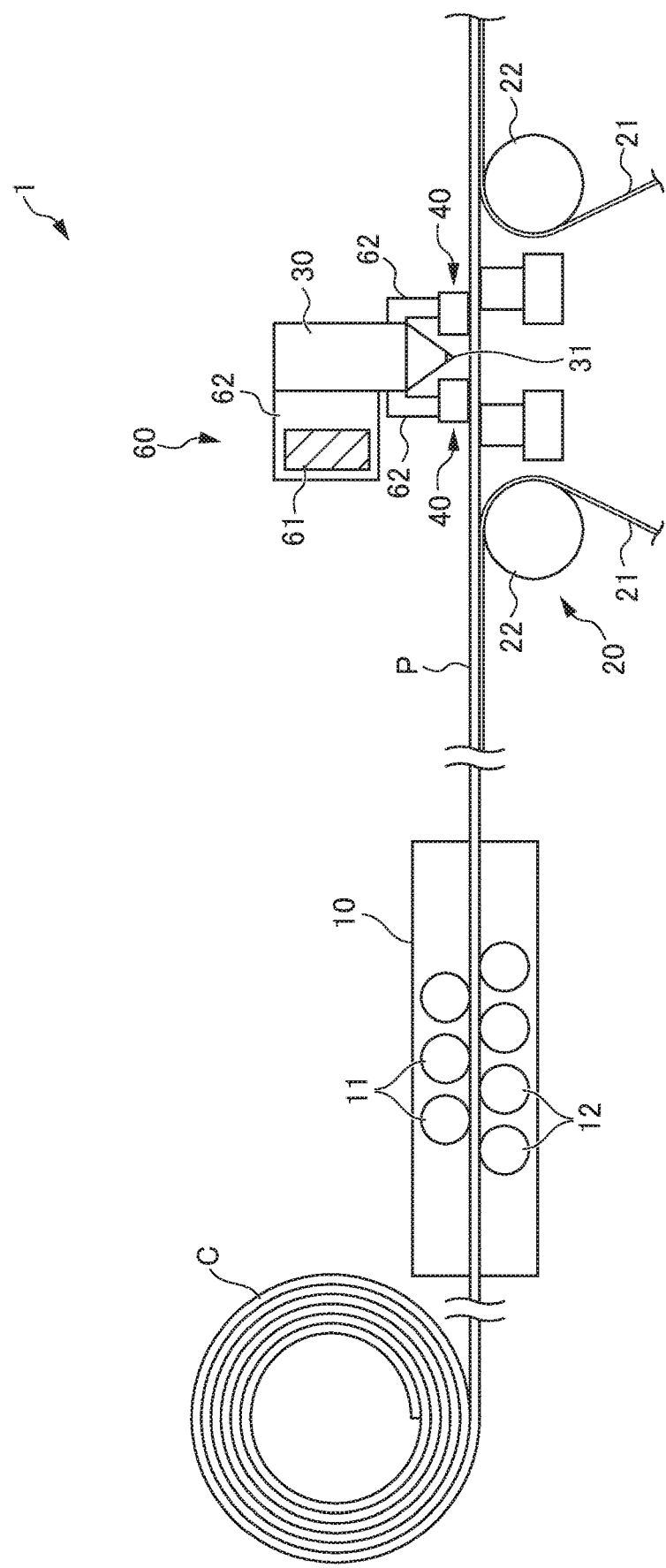
FIG. 1 is a side schematic view illustrating a laser processing device 1 according to a first embodiment of the present invention.
Figure 2:
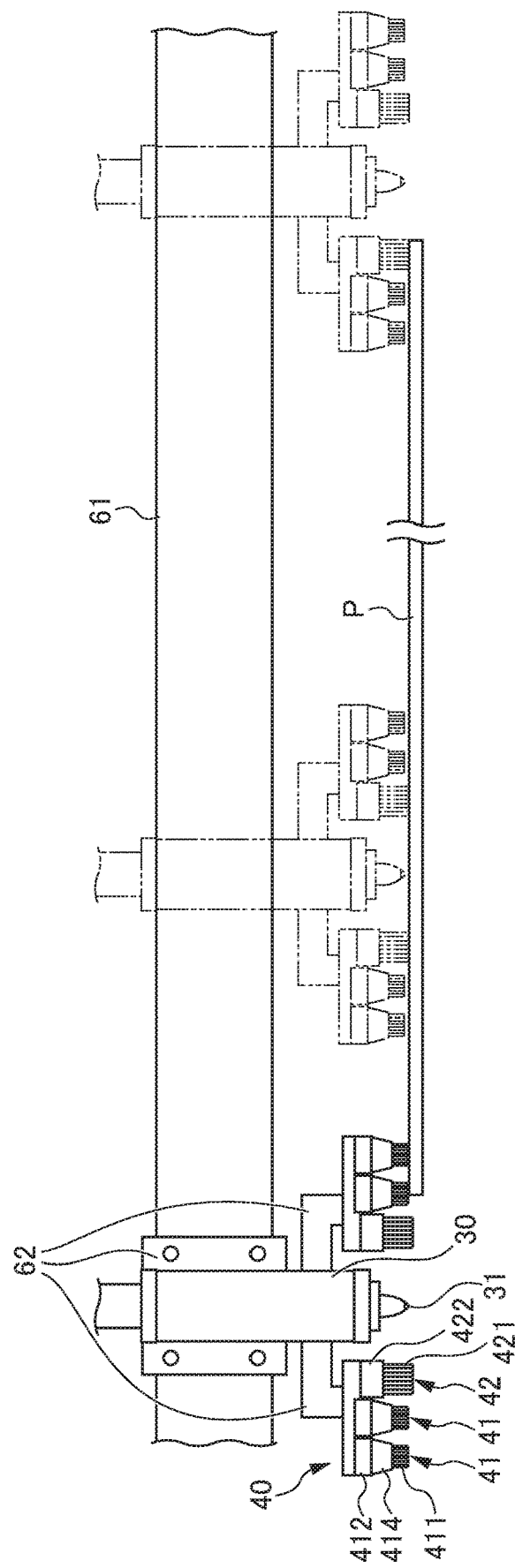
FIG. 2 is a front view illustrating a state in which a laser irradiation unit 30 and a workpiece holding tool 40 of a laser processing device 1 according to the first embodiment of the present invention move.
Figure 3:
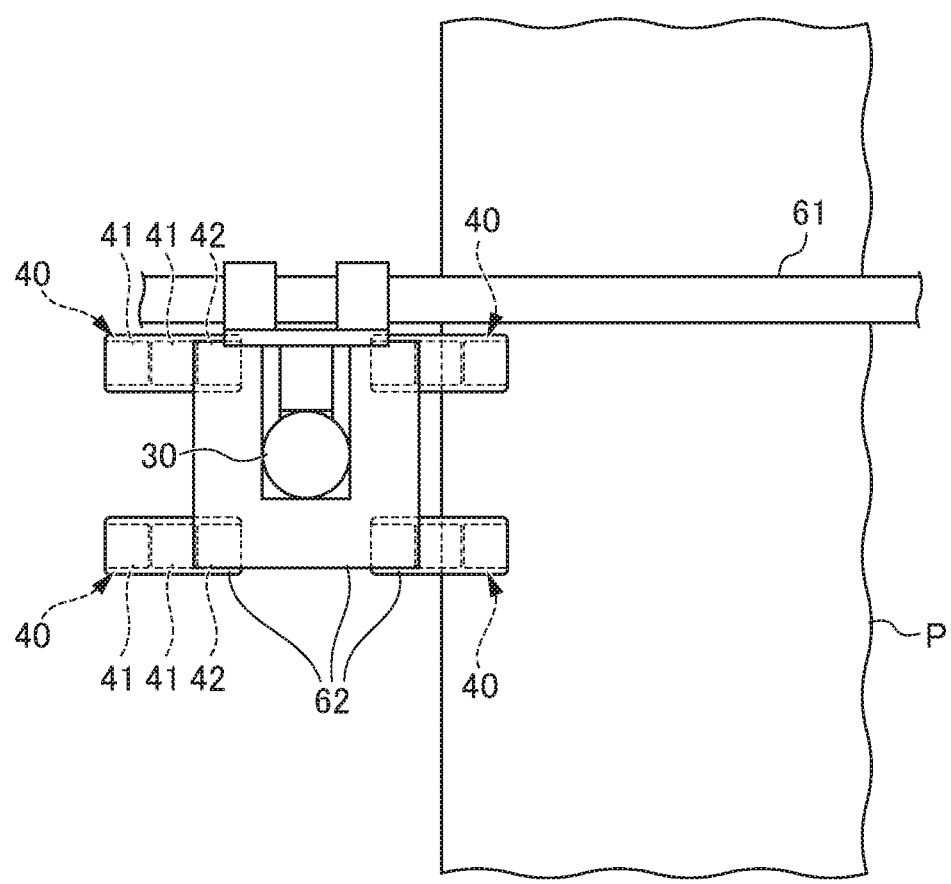
FIG. 3 is a plan view illustrating a state in which the laser irradiation unit 30 of the laser processing device 1 according to the first embodiment of the present invention is moved to the outer part of a portion just above the plate material P.

A first embodiment of the present invention will be described in detail with reference to the drawings. FIG. 1 is a side schematic view illustrating a laser processing device 1 according to a first embodiment of the present invention. FIG. 2 is a front view illustrating a state in which a laser irradiation unit 30 and a workpiece holding tool 40 of the laser processing device 1 according to the first embodiment of the present invention move. FIG. 3 is a plan view illustrating a state in which the laser irradiation unit 30 of the laser processing device 1 according to the first embodiment of the present invention is moved to the outer part of the portion just above the plate material P.

As illustrated in FIG. 1, the laser processing device 1 is a device for cutting a plate material P by laser irradiation while conveying a flat plate material P to form a blank material of a desired shape, and has a leveler device 10, a plate material conveying device 20, a laser irradiation unit 30, a workpiece holding tool 40, a driving unit 60, and an upstream wave height sensor (not illustrated). Throughout the present description and in the claims, the term "workpiece stabilizing tool" can be used interchangeably with the term "workplace holding tool", since the tool presses on and vertically stabilizes the workpiece during forward movement thereof, but does not hold the workpiece stationary or in a fixed position, since the workpiece may be allowed to move in relation to the tool.

The leveler device 10 has a plurality of upper rollers 11 and a plurality of lower rollers 12. A rotation axis of the upper rollers 11 and a rotation axis of the lower rollers 12 are disposed to have a parallel positional relation. As illustrated in FIG. 1, the upper rollers 11 and the lower rollers 12 are disposed alternately above and below along the direction in which the plate material P is conveyed in a positional relation of being mutually displaced in the vertical direction. By the upper rollers 11 and the lower rollers 12, the plate material P sent from the coil material C is flattened, and the straightening is performed. The plate material P subjected to the straightening is detected by an upstream wave height sensor (not illustrated) as to whether or not the waviness of the plate material P is within a predetermined wave height range. In a case where the waviness of the plate material P is within a predetermined wave height range, the plate material P is sent to the laser irradiation unit 30 for laser cutting, and when the waviness is not within the predetermined wave height range, sending of the plate material P is stopped so that the plate material P is not sent to the laser irradiation unit 30 for laser cutting.

The plate material conveying device 20 has a conveyor 21. The conveyor 21 is constituted by, for example, an endless conveyor, and is supported and conveyed by a plurality of rollers 22. The plate material P sent from the coil material C is conveyed while being placed on the conveyor 21. A portion of the conveyor 21 facing the laser irradiation unit 30 is disposed so as to be separated from the plate material P by a predetermined distance and sent vertically below the plate material P.

The driving unit 60 has an X-axis rail 61, a Y-axis rail (not illustrated), and a support member 62. The X-axis rail 61 extends in parallel with the width direction of the plate material P, which is a direction orthogonal to the direction in which the plate material P is sent out. The X-axis rail 61 supports the laser irradiation unit 30 and the support member 62 supporting the workpiece holding tool 40 so as to be movable relative to the X-axis rail 61 in parallel to a longitudinal direction of the X-axis rail 61. Further, a Y-axis rail (not illustrated) supports the X-axis rail 61 so as to be movable relative to the Y-axis rail (not illustrated) in parallel to the longitudinal direction of the Y-axis rail (not illustrated). With this configuration, the driving unit 60 can move the laser irradiation unit 30 from a position located just above the plate material P (located vertically above the plate material P) to a position located outside the portion just above the plate material P (located at a position deviated from vertically above the plate material P) in the width direction of the plate material P sent from the coil material C.

The laser irradiation unit 30 is capable of irradiating a plate material P disposed vertically downward with a laser beam from the laser nozzle 31, and cuts the plate material P with a laser beam to make the plate material P into a blank material having a desired shape. The laser irradiation unit 30 is supported by the support member 62 and is movable along the X-axis rail 61 and the Y-axis rail (not illustrated) integrally with the support member 62. The laser irradiation unit 30 is movable from an operative position, located just above the plate material P, to a resting position spaced away from the plate material and located outside the portion just above the plate material, in the width direction of the plate material P sent from the coil material C, while selectively irradiating the plate material P, disposed vertically downward, with the laser beam from the laser nozzle 31.

For example, a solid laser, a liquid laser gas laser semiconductor laser, a free electron laser, a metal vapor laser, a chemical laser, or the like can be used as the laser beam, and in this embodiment, a YAG laser is used. Further, as the plate material P cut by the laser beam, not only a metal such as iron, aluminum, titanium, and magnesium, but also glass, ceramic, resin, or combination material thereof may be used, as long as the material is cut by laser beam.

As illustrated in FIG. 3, a total of four workpiece holding tools 40, including two of workpiece holding tools 40 arranged in a direction in which the plate material P is fed out (downward direction in FIG. 3), and two workpiece holding tools 40 arranged in a direction orthogonal to the direction in which the plate material P is fed out (width direction to the direction in which the plate material P is fed out, and a left-right direction of FIG. 3) are disposed. There is a positional relation that surrounds the laser irradiation unit 30 from four directions by the four workpiece holding tools 40 in a plan view. Hereinafter, for convenience of explanation, the two workpiece holding tools 40 disposed on the left side in FIG. 3 will be referred to as a "left workpiece holding tool 40" and the two workpiece holding tools 40 disposed on the right side in FIG. 3 will be referred to as a "right workpiece holding tool 40".

One workpiece holding tool 40 has two first workpiece holding tools 41 and one second workpiece holding tool 42. In one workpiece holding tool 40, one second workpiece holding tool 42 is disposed to be closer to the center in a direction (width direction with respect to the direction in which the plate material P is fed out) orthogonal to the direction in which the plate material P is fed out, and the two first workpiece holding tools 41 are adjacent to the second workpiece holding tool 42, and are disposed side by side on the side away from the center of the plate material P, in a direction (the width direction with respect to the direction in which the plate material P is fed out) orthogonal to the direction in which the plate material P is fed out. That is, the second workpiece holding tool 42 is disposed to be closer to the laser irradiation unit 30 than the first workpiece holding tool 41. The first workpiece holding tool 41 is mainly used for correcting the waviness of the plate material P. Further, the second workpiece holding tool 42 is mainly used for suppressing the vibration of the plate material P.

As illustrated in FIG. 2, the first workpiece holding tool 41 has a brush portion 411, a brush holding portion 412, and a cap 414. The brush portion 411 has a plurality of bristles (wire materials). The plurality of bristles is made of a material having incombustibility or flame retardance, and is, for example, made of carbon fibers in the present embodiment.

The plurality of bristles of the brush portion 411 has a positional relation in which an axial direction is parallel to a vertical direction. The lower end portions of the plurality of bristles can abut on the upper surface of the plate material P. By the abutment, in the vertical direction, the first workpiece holding tool 41 holds the plate material P at a first predetermined vertical position, or height, where the vertical distance between the lower end of the laser nozzle 31 of the laser irradiation unit 30 and the plate material P is within the first predetermined value range, while still permitting outward movement of the plate material P. The abutment occurs in a case where the laser irradiation unit 30, the first workpiece holding tool 41, and the support member 62 are located at the left end position illustrated in FIG. 2 or in a case where the laser irradiation unit 30, the first workpiece holding tool 41, and the support member 62 are located at a position (a position moved to the right further than the position of the right end illustrated in FIG. 2) symmetric with respect to the position illustrated at the left end in FIG. 2 about the center in the width direction of the plate material P.

The cap 414 has a downwardly tapered hollow frustoconical shape. The upper end portions of the plurality of bristles are made of copper, bundled by a cap 414, and fixed to the brush holding portion 412. The cap 414 is mainly used for bundling a plurality of bristles to increase the density of a plurality of bristles and increase rigidity of the brush portion 411 including a plurality of bristles, and used for adjusting the length of a plurality of bristles. The brush holding portion 412 is detachably supported by a support member 62 that supports the laser irradiation unit 30. Thus, the first workpiece holding tool 41 is movable along the X-axis rail 61 and a Y-axis rail (not illustrated), integrally with the laser irradiation unit 30. Further, although the first workpiece holding tool 41 can be exchanged in one unit, that is, one workpiece holding tool 40 has two first workpiece holding tools 41, they can be independently and individually exchanged.

The second workpiece holding tool 42 has a brush portion 421 and a brush holding portion 422. The brush portion 421 has a plurality of bristles (wire materials) disposed in a parallel positional relation. The plurality of bristles is made of a material having incombustibility or flame retardance, and in the present embodiment, for example, the plurality of bristles is made of carbon fibers.

The plurality of bristles of the brush portion 421 have a positional relation in which the axial direction is parallel to the vertical direction. The lower end portions of the plurality of bristles can abut on the upper surface of the plate material P. By the abutment, in the vertical direction, the second workpiece holding tool 42 holds the plate material P at a second predetermined position where the distance between the lower end of the laser nozzle 31 of the laser irradiation unit 30 and the plate material P is within a second predetermined value range. More specifically, the lower end portions of the plurality of bristles of the brush portion 421 are located below the lower end portions of the plurality of bristles of the brush portion 411 of the first workpiece holding tool 41 in the vertical direction, and the second predetermined position is located below the first predetermined position in the same direction. Accordingly, the lower end portions of the plurality of bristles of the second workpiece holding tool 42 have smaller clearance with respect to the plate material P than the lower end portions of the plurality of bristles of the first workpiece holding tool 41.

The abutment between the lower end portions of the plurality of bristles of the second workpiece holding tool 42 and the plate material P is performed, when the laser irradiation unit 30 or the like is located at the right end illustrated in FIG. 2, in a case where the laser irradiation unit 30, the second workpiece holding tool 42, and the support member 62 are at a substantially central position illustrated in FIG. 2, that is, in a case where the laser irradiation unit 30 is located just above the plate material P or in a case where the laser irradiation unit 30 is present outside the portion just above the plate material P.

The upper end portions of the plurality of bristles of the brush portion 421 are made of copper and fixed to the brush holding portion 422. Unlike the first workpiece holding tool 41, the second workpiece holding tool 42 does not have a cap 414. The brush holding portion 422 is detachably supported by a support member 62 that supports the laser irradiation unit 30. As a result, the second workpiece holding tool 42 is movable along the X-axis rail 61 and the Y-axis rail (not illustrated) integrally with the laser irradiation unit 30, and the second workpiece holding tool 42 can be replaced.

Even when the laser irradiation unit 30 is moved to a position located outside the portion just above the plate material P by driving the driving unit 60, the second workpiece holding tool 42 provided on at least one of the two workpiece holding tools 40 on the right side and the two workpiece holding tools 40 on the left side is always disposed just above the plate material P. That is, the lower ends of the plurality of bristles of the brush portion 421 of the second workpiece holding tool 42 always abut on the upper surface of the plate material P. As a result, even when the laser irradiation unit 30 is located outside the portion just above the plate material P, the workpiece holding tool 40 is located at a position capable of holding the end portion of the plate material P at the second predetermined position.

Even if the laser irradiation unit 30 further moves to a position deviated from the center of the plate material P in the width direction of the plate material P by driving the driving unit 60, the first workpiece holding tool 41 provided on at least one of the two workpiece holding tools 40 on the right side and the two workpiece holding tools 40 on the left side is always disposed just above the plate material P. That is, the lower ends of the plurality of bristles of the brush portion 411 of the first workpiece holding tool 41 always abut on the upper surface of the plate material P. As a result, even when the laser irradiation unit 30 is located outside the portion just above the plate material P, the workpiece holding tool 40 is located at a position capable of holding the end portion of the plate material P at the first predetermined position.

A laser processing method performed by the laser processing device 1 having the above-described configuration will be described. In the laser processing method, first, the plate material P, which is sent from the coil material C, flattened and straightened by the leveler device 10, is sent until the plate material P reaches the position of the laser irradiation unit 30. Next, the laser irradiation unit 30, the workpiece holding tool 40, and the support member 62 are mainly moved in the direction along the X-axis rail 61 by the driving unit 60, and the laser irradiation unit 30 is moved just above the plate material P. At this time, the lower end portions of the plurality of bristles of the brush portion 421 of the second workpiece holding tool 42 of the workpiece holding tool 40 abut on the upper surface of the plate material P. In the vertical direction, the second workpiece holding tool 42 holds the plate material P at the second predetermined position where the distance between the lower end of the laser nozzle 31 of the laser irradiation unit 30 and the plate material P is separated within the range of the second predetermined value. While maintaining this state, while moving the laser irradiation unit 30, the workpiece holding tool 40, and the support member 62 mainly in the direction along the X-axis rail 61 by the driving unit 60, laser beam is emitted from the laser nozzle 31 of the laser irradiation unit 30 to the plate material P to cut the plate material P. At this time, the lower end portions of the plurality of bristles of the brush portion 421 of the second workpiece holding tool 42 of the workpiece holding tool 40 do not abut on the upper surface of the plate material P, but are separated from the upper surface of the plate material P.

Next, a plate material end portion holding process is performed. In the plate material end portion holding process, while irradiating the plate material P with a laser beam from the laser nozzle 31 of the laser irradiation unit 30 to cut the plate material P, by moving the laser irradiation unit 30, the workpiece holding tool 40, and the support member 62 mainly in the direction along the X-axis rail 61 by the driving unit 60, the laser irradiation unit 30 is located outside the portion just above the plate material P. At this time, the lower end portions of the plurality of bristles of the brush portion 421 of the second workpiece holding tool 42 still abut on the upper surface of the plate material P (see the state illustrated at the right end of FIG. 2). As a result, the position of the end portion of the plate material P in the vertical direction is held at the second predetermined position. Furthermore, when the laser irradiation unit 30 is separated from the center of the plate material P in the width direction of the plate material P, the lower end portions of the plurality of bristles of the brush portion 411 of the first workpiece holding tool 41 abut on the upper surface of the plate material P (see the state illustrated at the left end of FIG. 2). As a result, in the vertical direction, the first workpiece holding tool 41 holds the plate material P at a first predetermined position where the distance between the lower end of the laser nozzle 31 of the laser irradiation unit 30 and the plate material P is separated within the range of the first predetermined value.

Next, a laser irradiation unit moving process is performed. In the laser irradiation unit moving process, while emitting the laser from the laser nozzle 31 of the laser irradiation unit 30, the laser irradiation unit 30 located outside the portion just above the plate material P by the driving unit 60 is brought closer to the center of the plate material P in the width direction of the plate material P (the direction along the X rail), and moved to the portion just above the plate material P. At this time, the lower end portions of the plurality of bristles of the brush portion 411 of the first workpiece holding tool 41 abut on the upper surface of the plate material P, and the position of the end portion of the plate material P in the vertical direction is held at the first predetermined position. Thus, the laser nozzle 31 of the laser irradiation unit 30 does not collide with the edge of the plate material P in the width direction of the plate material P.

Further, while emitting the laser from the laser nozzle 31 of the laser irradiation unit 30, the laser irradiation unit 30 is brought closer to the center of the plate material P in the width direction (direction along the X rail) of the plate material P. Thus, the lower end portions of the plurality of bristles of the brush portion 421 of the second workpiece holding tool 42 abut on the upper surface of the plate material P again, and the position of the end portion of the plate material P in the vertical direction is held at the second predetermined position. By repeatedly performing the plate material end portion holding process and the laser irradiation unit moving process as described above, the plate material P is cut off and a blank material is obtained.

According to the present embodiment, the following effects are obtained. In the present embodiment, in the laser processing method, the plate material P is cut by laser irradiation. The laser processing method has a plate material end portion holding process of holding the position of the end portion of the plate material P at a predetermined position when the laser irradiation unit 30 is present outside the portion just above the plate material P, and a laser irradiation unit moving process in which the laser irradiation unit 30 moves to the portion just above the plate material from the outer part of the portion just above the plate material P.

Therefore, in the plate material end portion holding process, when the laser irradiation unit 30 is present outside the portion just above the plate material P, the position of the end portion of the plate material P is held at a predetermined position (a first predetermined position or a second predetermined position) above the plate material P in the vertical direction. Accordingly, when moving the laser irradiation unit 30 to the portion just above the plate material P from the outer part of the portion just above the plate material P in the laser irradiation unit moving process, it is possible to prevent the laser nozzle 31 of the laser irradiation unit 30 from colliding with the edge of the plate material P in which the waviness occurs.

Further, in the laser irradiation unit moving process, the laser irradiation unit 30 is moved in a state of holding the position of the plate material P at a predetermined position (the first predetermined position or the second predetermined position). This makes it possible to reliably prevent the laser nozzle 31 of the laser irradiation unit 30 from colliding with the edge of the plate material P, when the laser irradiation unit 30 is moved from the outer part of the portion just above the plate material P to the portion just above the plate material P in the laser irradiation unit moving process.

Further, in the laser irradiation unit moving process, the laser irradiation unit 30 is moved, while emitting the laser from the laser irradiation unit 30. Therefore, the plate material P can be cut by laser irradiation, from the edge of the plate material P in the movement direction (width direction of the plate material P) of the laser irradiation unit 30.

Further, in the plate material end portion holding process, the end portion of the plate material P is held at the first predetermined position by the first workpiece holding tool 41. The plate material P is held at the second predetermined position by the second workpiece holding tool 42 having a smaller clearance with respect to the plate material P than the first workpiece holding tool 41 in the laser irradiation unit moving process.

Therefore, after correcting the waviness in the plate material P by the first workpiece holding tool 41, the vibration is suppressed by the second workpiece holding tool 42, and the distance between the laser nozzle 31 of the laser irradiation unit 30 and the plate material P can be suppressed with high accuracy to a range of the second predetermined value which is a range of an appropriate distance value in which the plate material P can be cut by laser irradiation. In addition, since the clearance between the second workpiece holding tool 42 and the plate material P is smaller than the clearance between the first workpiece holding tool 41 and the plate material P, when the laser irradiation unit 30 moves on the plate material P, only the second workpiece holding tool 42 comes into contact with the plate material P to ensure a clearance, and the first workpiece holding tool 41 is in a state of not coming into contact with the plate material P. Since only the second workpiece holding tool 42 comes into contact with the plate material P, the friction with the plate material P can be reduced as compared with a case where both the first workpiece holding tool 41 and the second workpiece holding tool 42 come into contact with the plate material P.

Further, in the present embodiment, the laser processing device 1 has the laser irradiation unit 30, the driving unit 60 that moves the laser irradiation unit 30 from the portion just above the plate material P to the outer part of the portion just above the plate material P, and a workpiece holding tool 40 that holds the plate material P at a predetermined position, while moving with movement of the laser irradiation unit 30. When the laser irradiation unit 30 is present outside the portion just above the plate material P, the workpiece holding tool 40 is located at a position where the end portion of the plate material P in which the waviness occurs can be held at a predetermined position (the first predetermined position or the second predetermined position).

Therefore, when the laser irradiation unit 30 is present outside the portion just above the plate material P, the position of the end portion of the plate material P can be held at a predetermined position (a first predetermined position or a second predetermined position) above the plate material P in the vertical direction. When the laser irradiation unit 30 is moved from the outer part of the portion just above the plate material P to the portion just above the plate material P, it is possible to prevent the laser nozzle 31 of the laser irradiation unit 30 from colliding with the edge of the plate material P.

The workpiece holding tool 40 includes a first workpiece holding tool 41, and a second workpiece holding tool 42 which is disposed closer to the laser irradiation unit 30 than the first workpiece holding tool 41 and has a smaller clearance with respect to the plate material P than the first workpiece holding tool 41.

Therefore, after correcting the waviness in the plate material P by the first workpiece holding tool 41, the vibration is suppressed by the second workpiece holding tool 42, and it is possible suppress the distance between the laser nozzle 31 of the laser irradiation unit 30 and the plate material P to the range of the second predetermined value with high accuracy. Further, since the clearance between the second workpiece holding tool 42 and the plate material P is smaller than the clearance between the first workpiece holding tool 41 and the plate material P, when the laser irradiation unit 30 moves on the plate material P, only the second workpiece holding tool 42 comes into contact with the plate material P to ensure a clearance, and the first workpiece holding tool 41 is in a state of not coming into contact with the plate material P. Since only the second workpiece holding tool 42 comes into contact with the plate material P, the friction with the plate material P can be reduced, as compared with a case where both the first workpiece holding tool 41 and the second workpiece holding tool 42 come into contact with the plate material P.

Figure 4:
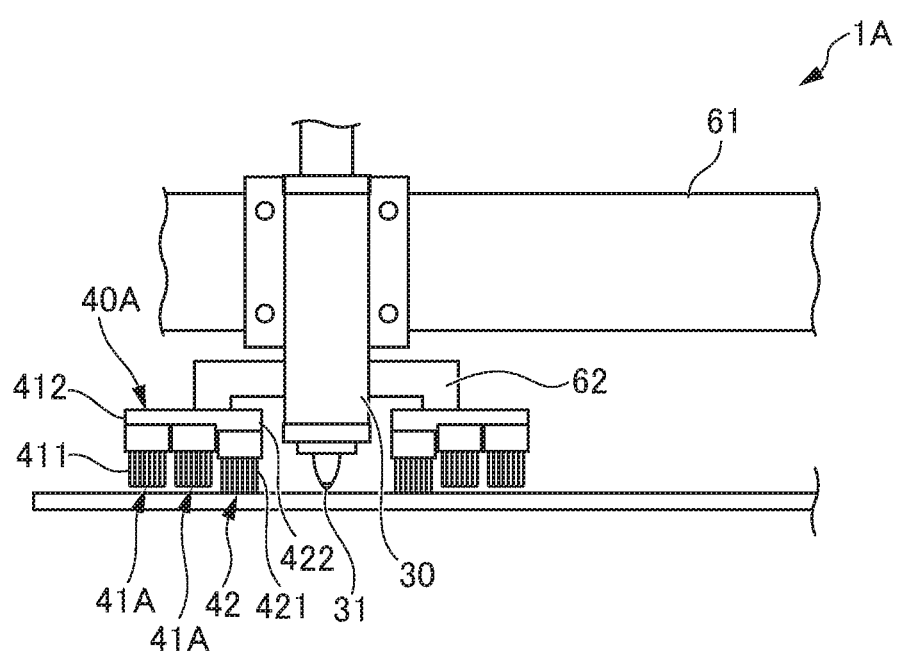
FIG. 4 is a front view illustrating a laser irradiation unit 30 and a workpiece holding tool 40A of a laser processing device 1A according to a second embodiment of the present invention.

Next, a second embodiment of the present invention will be described in detail with reference to the drawings. Hereinafter, the same configurations as those of the first embodiment are denoted by the same reference numerals, and a detailed description thereof will not be provided. A configuration of a workpiece holding tool 40A according to the present embodiment is different from the configuration of the workpiece holding tool 40 in the first embodiment. FIG. 4 is a front view illustrating the laser irradiation unit 30 and the workpiece holding tool 40A of the laser processing device 1A according to the second embodiment of the present invention.

The first workpiece holding tool 41A constituting the workpiece holding tool 40A does not have a cap 414. Therefore, the plurality of bristles is not bundled, like the second workpiece holding tool 42. With this configuration, it is possible to facilitate the manufacture of the first workpiece holding tool 41 and to simplify the structure of the first workpiece holding tool 41A.

The present invention is not limited to the embodiments, but includes a modification, an improvement, or the like in the range for reaching the object of the present invention. For example, the configurations of each part of the laser processing device are not limited to the configuration of each part of the laser processing device in this embodiment. For example, the configurations of the laser irradiation unit, the driving unit, the workpiece holding tool, the plate material conveying device, the leveler device, and the like are not limited to those of the laser irradiation unit 30, the driving unit 60, the workpiece holding tool 40, the plate material conveying device 20, the leveler device 10, and the like.

Further, for example, in the present embodiment, one workpiece holding tool 40 has two first workpiece holding tools 41 and one second workpiece holding tool 42, but the number thereof is not limited to this number.

EXPLANATION OF REFERENCE NUMERALS

1, 1A laser processing device
30 laser irradiation unit
40 workpiece holding tool
41, 41A first workpiece holding tool
42 second workpiece holding tool
60 driving unit
P plate material

The invention claimed is:

1. A laser processing method for cutting a plate material by laser irradiation from a laser irradiation head while the plate material is continuously fed out from a coil thereof, the method comprising the steps of:
   cutting the plate material by laser irradiation from the laser irradiation head while conveying the plate material, wherein the laser irradiation head is configured to be movable in a width direction of the plate material between an operative position, located just above and inside a side edge portion of the plate material, and a resting position spaced outside the side edge portion of the plate material in the width direction; and
   moving a first plate material stabilizing tool and the laser irradiation head in the width direction, the first plate material stabilizing tool operable to hold the side edge portion of the plate material at a first predetermined position when the laser irradiation head is present in the resting position;
   wherein, when the laser irradiation head is in the operative position, the plate material is held at a second predetermined position by a second plate material stabilizing tool wherein the second plate material stabilizing tool having a smaller clearance with respect to an upper surface of the plate material than a clearance of the first plate material stabilizing tool with respect to the upper surface of the plate material, to maintain the laser irradiation at a height just above a level of the plate material;
   wherein the first plate material stabilizing tool is disposed adjacent to the second plate material stabilizing tool such that the second plate material stabilizing tool is disposed in between the first plate material stabilizing tool and the laser irradiation head in the width direction of the plate material,
   and wherein the first plate material stabilizing tool and the second plate material stabilizing tool are located on an outside of the laser irradiation head.

2. The laser processing method according to claim 1, wherein the laser irradiation unit is moved while emitting the laser irradiation from the laser irradiation unit.

3. A laser processing method for cutting a plate material by laser irradiation by a laser irradiation head while the plate material is continuously fed out from a coil thereof, the method comprising the steps of:
   catting the plate material by laser irradiation from the laser irradiation unit head, wherein the laser irradiation head is movable in a width direction of the plate material between an operative position, located just above and inside a side edge portion of the plate material, and a resting position spaced outside the side edge portion of the plate material in the width direction; and
   moving a first plate material stabilizing tool outwardly in the width direction of the plate material, the first plate material stabilizing tool configured to hold the side edge portion of the plate material at a first predetermined height, when the laser irradiation head reaches the resting position,
   wherein during the cutting step, the plate material is held at a second predetermined height by a second plate material stabilizing tool, wherein the second plate material stabilizing tool having a smaller clearance with respect to an upper surface of the plate material than a clearance of the first plate material stabilizing tool with respect to the upper surface of the plate material, to maintain the laser irradiation head at a height just above a level of the plate material;
   wherein the first plate material stabilizing tool is operatively connected to, and is disposed adjacent to the second plate material stabilizing tool such that the second plate material stabilizing tool is operatively connected to, and is disposed between the first plate material stabilizing tool and the laser irradiation head in the width direction of the plate material,
   and wherein the first plate material stabilizing tool and the second plate material stabilizing tool are located on an outside of the laser irradiation head.

* * * * *